United States Patent [19]

Ramseyer

[11] 4,306,397
[45] Dec. 22, 1981

[54] MOUNTING MEANS FOR A STORAGE CONTAINER FOR FUEL ASSEMBLY CLUSTERS

[75] Inventor: Fritz Ramseyer, Elgg, Switzerland

[73] Assignee: Sulzer Brothers Limited, Winterthur, Switzerland

[21] Appl. No.: 68,656

[22] Filed: Aug. 22, 1979

[30] Foreign Application Priority Data

Aug. 22, 1978 [CH] Switzerland .......................... 8899/78

[51] Int. Cl.³ ............................................. E02D 27/00
[52] U.S. Cl. ........................................ 52/295; 52/698; 250/517
[58] Field of Search ................ 52/698, 295, 729, 690; 250/506, 507, 517; 248/678, 679

[56] References Cited

U.S. PATENT DOCUMENTS

| | | | |
|---|---|---|---|
| 2,369,121 | 2/1945 | Freeman | 52/690 X |
| 2,624,261 | 11/1955 | Rensak | 52/295 |
| 2,691,293 | 10/1954 | Patterson | 52/698 X |
| 3,217,659 | 11/1955 | Ford | 52/729 X |
| 3,512,738 | 5/1970 | Galbarisi et al. | 52/295 X |
| 4,143,277 | 3/1979 | Krieger | 250/506 X |
| 4,178,729 | 12/1979 | Jennings | 250/517 X |
| 4,187,433 | 2/1980 | Zezza | 250/506 X |

Primary Examiner—Carl D. Friedman
Attorney, Agent, or Firm—Kenyon & Kenyon

[57] ABSTRACT

The mounting means for the storage containers consists of an upper strip of stainless steel, a lower strip of ordinary structural steel and connecting posts which are welded between the two strips. The upper end of the posts are formed as fastening bolts for storage containers or are adapted to receive fastening bolts for securing a storage container in place.

9 Claims, 3 Drawing Figures

MOUNTING MEANS FOR A STORAGE CONTAINER FOR FUEL ASSEMBLY CLUSTERS

This invention relates to a mounting means for a storage container for fuel assembly clusters.

As is known, various devices have been provided for securing storage containers or boxes which receive fuel assembly clusters in the bottom of a water pit. Generally, such devices have beams which cannot be cast into concrete at the bottom of the water pit with upstanding fastening bolts which protrude into the pit space. In some cases, the beams have been constructed as I-beams with a number of screw bolts butt-welded to the surface of the beams as fastening bolts. Such I-beams are cast into the concrete at the bottom of a water pit with the upper edges flush. Subsequently, the pit bottom is covered with a sheet metal lining of austenitic steel which is either welded in strip-fashion to the upper flanges of two adjacent I-beams or is installed over the entire pit bottom with cutouts for the screw bolts. The lining is then welded tightly to the screw bolts. In such constructions, the storage containers are fastened to the bottom of the water pit via the screw bolts.

It has, however, been found that the above types of constructions are very expensive. For example, if the I-beams are fully covered by the lining of stainless steel sheet, expensive fitting work is necessary. On the other hand, if the lining is brought only up to the I-beam and tightly welded thereto, then the heavy I-beams must themselves be made of stainless steel. Furthermore, butt-welding of the fastening bolts to the upper flange of an I-beam is very unsatisfactory from the point of view of breaking strength since there is a considerable danger that the cross-section of the bolt is not welded through completely.

Accordingly, it is an object of the invention to provide a mounting means which can be manufactured at reduced cost.

It is another object of the invention to provide a mounting means for a storage container for fuel assembly clusters which can be manufactured in an economical manner.

It is another object of the invention to provide a mounting means for a storage container which permits an operationally safe connection of fastening bolts to a beam.

Briefly, the invention provides a mounting means for a storage container which can be readily disposed within the bottom of a water pit for the storage of fuel assembly clusters of nuclear reactors. The mounting means is comprised of a plurality of beams, each of which includes an upper strip of stainless steel, a lower strip of steel and at least one row of posts disposed in longitudinally spaced relation along the strips. Each post extends transversely through each strip in welded relation thereto and has a threaded end above the upper strip. The threaded end may be integrally formed on each post or may be in the form of a threaded bolt which is threaded into a bore in an upper end of each post. In this latter case, each post has an upper end which is flush with an upper surface of the upper strip and the bore is tapped in this upper end.

The construction of the mounting means is such that reinforcing bars for the concrete to form the pit bottom can be arranged cross-wise to the beams up to near the surface of the concrete. In this way, the thickness of the concrete bottom or base of the pit can be made smaller.

In the case where the post have an integrally threaded end, a minimum of labor is required to make the mounting means.

In a case where separate bolts are threaded into the upper ends of the posts, the beams can be faced off at the upper flange before the bolts are installed. The subsequent attachment of the bolts in the bores of the posts permits the storage containers to be more easily positioned when lowered to the bottom of the water pit than if the containers were fastened via head screws.

In one embodiment, the posts may be formed as J-shaped elements which pass upwardly through the two strips with a threaded end exposed at the upper ends.

In another embodiment, each post can be provided at the lower end which is flush with the lower strip with a threaded bore into which a fastening rod is threaded. Such fastening rods can also be provided with an external thread on the lower end to permit leveling of the mounting means prior to pouring of concrete. To this end, a pair of nuts can be threaded onto the lower ends of the fastening rods about a flat steel bracket through which the fastening rods extend. In this way, the rods act not only to level the beams but also serve as tie rods.

The mounting means may also be provided with a pair of sheets which are welded to and extend outwardly from opposite longitudinal edges of the upper strip. Such sheets can be used to line the water pit. This construction allows the use of simple welded joints between the beams and the lining of the pit so that the probability of leaks occurring is reduced.

In addition, a channel can be welded to the upper strip of each beam below a longitudinal edge with a free upper edge extending into substantially flush relation with an adjacent sheet in order to define a drainage channel for water. In this way, leakage water that might be radioactively contaminated can be drawn off through the channels via a suitable drainage system and thus prevent it from penetrating into the concrete of the pit.

These and other objects and advantages of the invention will become more apparent from the following detailed description and appended claims taken in conjunction with the accompanying drawings in which:

Figure 1:
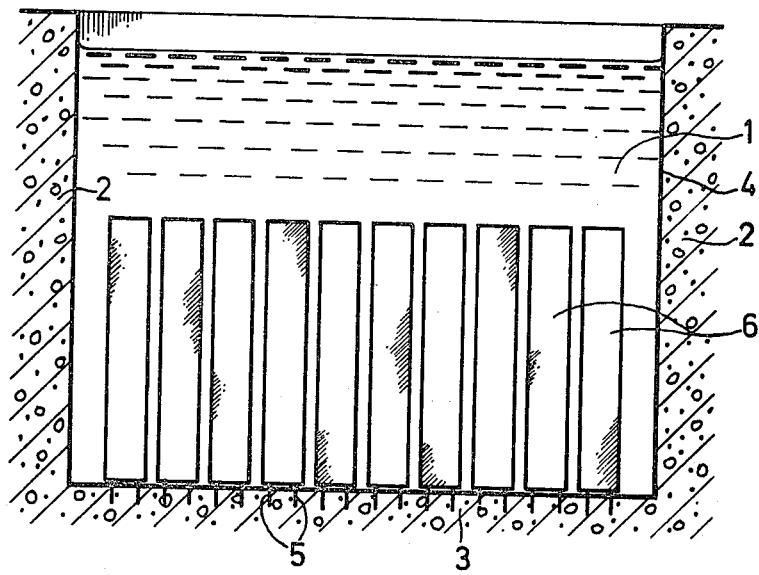
FIG. 1 illustrates a vertical cross-sectional view through a storage pit having a mounting means in accordance with the invention.

Referring to FIG. 1, a fuel storage pit 1 which is filled with water has side walls 2 and a bottom 3 of reinforced concrete. The pit 1 is lined on the water side with a lining 4 of stainless steel sheet. As indicated, the bottom 3 of the pit is provided with a plurality of mounting means for a series of storage containers 6 which hold fuel assembly clusters of nuclear reactors. Each container 6 has a considerable height as compared to the base area and, thus, in view of the inertial forces acting on the containers in the event of an earthquake, a secure fastening of the containers to the pit bottom 3 is very important.

Figure 2:
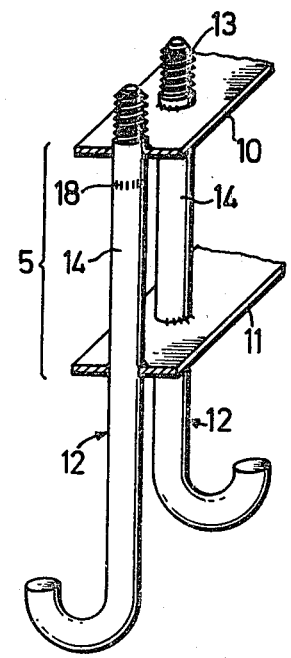
FIG. 2 illustrates one embodiment of a mounting means according to the invention.

Referring to FIG. 2, each mounting means is constructed of a plurality of beams 5. Each beam 5 includes an upper strip 10 of stainless steel and a lower strip 11 of ordinary ferritic structural steel. The two strips 10, 11 are drilled together so as to have holes formed therein. In addition, each beam has at least one row of J-shaped rods 12 which extend through the strips 10, 11. These rods 12 define posts 14 between the strips 10, 11 which are disposed in longitudinally spaced relation along the strips 10, 11. As indicated, each post 14 extends transversely through each strip 10, 11 in welded relation thereto and has a threaded end 13 protruding above the upper strip 10. Since the rods succeed each other in a row in relatively closely spaced relation, the posts 14 have the affect of a web with respect to the two strips 10, 11. The entire mounting means thus has considerable bending stiffness and can be accurately placed in an excavation and draft a cast in concrete up to the upper edge of the strip 10.

The ends of the rods 12 which protrude from the upper strip 10 and which contain the threaded end 13 preferably consist of stainless steel. In order to save some of this expensive material, the rods 12 can be made of austenitic steel up to a point 18 with the remaining ferritic part being welded thereto. Welding in the vicinity of the point 18 has the advantage that the weld can be easily tested in a non-destructive manner, for example with the use of ultra sound.

Figure 3:
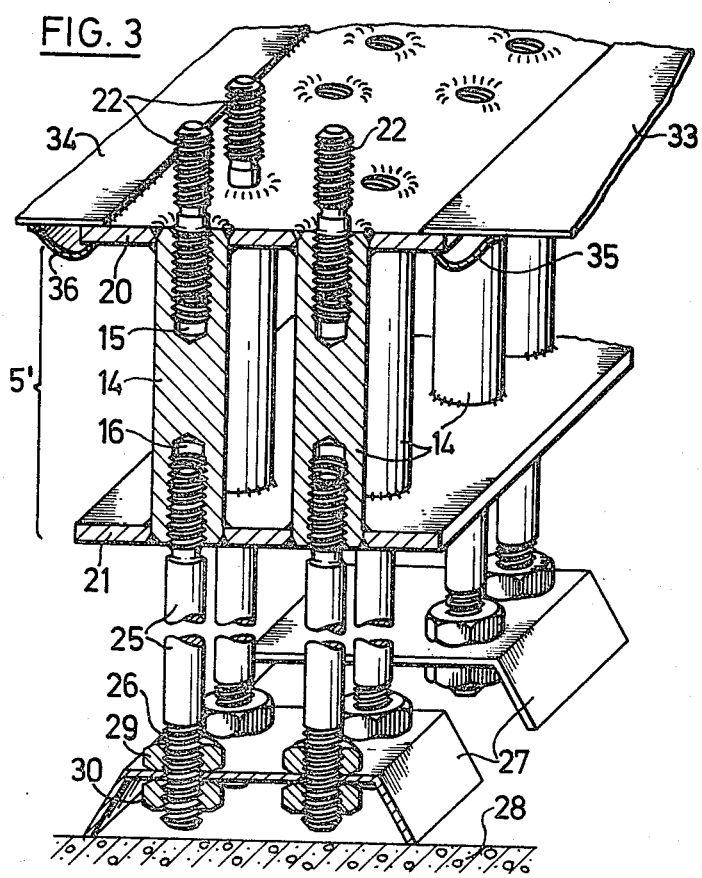
FIG. 3 illustrates a further embodiment of a mounting means in accordance with the invention.

Referring to FIG. 3, the mounting means may alternatively be made of a different construction. To this end, each beam 5' consists of an upper strip 20 of stainless steel and a lower strip 21 of ordinary carbon steel as well as of two rows of connecting posts 14 which preferably consist of stainless steel. The two strips 20, 21 are drilled together while the connecting post 14 which is tightly welded into the strips 20, 21 has a threaded bore 15, 16 tapped into each end. In addition, a fastening bolt 22 of stainless steel is threaded into the upper blind bores 15. As shown, each bolt 22 has a thread at both ends and a cylindrical fitting surface in the middle.

A ferritic fastening rod 25 is threaded into the lower bore 16 of each post 14 and, likewise, has a thread at both ends.

As shown, a flat steel bracket is disposed below the strip 21. This bracket 27 has a plurality of holes through which the rods 25 pass in unthreaded relation. As indicated, the longitudinal edges of the bracket 27 are bent from the central portion.

Each fastening rod 25 has a pair of nuts 29, 30 threaded onto the lower thread 26 to opposite sides of the bracket 27. By means of the nuts 29, 30, the height position of the beam releative to the flat brackets 27 can be set.

As shown in FIG. 3, a pair of sheets 33, 34 are welded to and extend outwardly from the opposite longitudinal edges of the upper strip 20 in order to act as a lining for the water pit. These sheets 33, 34 are welded tightly to the upper strip 20 with a slight overlap. In addition, a channel 35, 36 is welded to the upper strip 20 below a respective longitudinal edge. Each channel 35, 36 has a free upper edge which extends into substantially flush relation with an adjacent sheet 33, 34 in order to define a drainage channel for water. To this end, the channels 35, 36 are connected to a drainage system (not shown) by means of which water that might have penetrated into the channels 35, 36 can be drawn off. The channels 35, 36 can also be connected to flushing lines.

The mounting means of FIG. 3 is preferably installed as follows:

First, narrow strip foundations are constructed at the bottom of an escavation for a storage pit 1. In addition, the ends of the flat brackets 27, split in the manner of a tie anchor, are imbedded into the concrete of the strip foundations. With the upper blind bores 15 temporarily closed off with plugs (not shown) the beams which consist of the strips 20, 21, the connecting posts 14 and the channels 35, 36 the fastening rods 25 (each carrying a nut 29) are threaded into the lower blind bores 16 at the construction site. The beams which are prepared in this manner are now inserted into the holes of the flat brackets 27, are laterally lined up by supports (not shown) and are levelled in height by adjusting the nuts 29. After levelling, the nuts 30 are screwed onto the threads 26 of the fastening rods 25 and tightened. Next, reinforcement steel (not shown) is placed in the escavation and may extend to just below the channels 35, 36. Thereafter, concrete is poured and vibrated, preferably in several time steps.

The beams can be secured against lateral shifting by connecting straps which can be supported at several fastening bolts 22 which have already been threaded in for this purpose. After the concrete has set and the connecting straps are removed, a level concrete layer is poured flush with the upper side of the upper strips 20. When this layer has set, the lining sheets 33, 34 are layed from one beam to the adjacent beam or from one beam to the lining of the pit walls 2. These sheets 33, 34 are then welded tightly to the beams and the lining of the walls, respectively. Thereafter, the remainder of the fastening bolts 22 are put in place.

The fuel storage pit 1 is thus ready to receive the storage containers 6. The storage containers 6, possibly with the interposition of bed plates, are each placed on four fastening bolts 22 and secured thereto via nuts (not shown).

It is to be noted that it will not always be necessary to fasten every fastening rod 25 in a flat bracket 27. For example, part of each rod 25 can be bent in J-shaped fashion at the lower end as shown in FIG. 2 or may be split in the manner of a tie anchor. Also, instead of having threads at both ends of the fastening bolts 22 as shown in FIG. 3, it is possible to thread head screws into the upper blind bores 15 to fasten the storage container 6 in place.

What is claimed is:

1. A mounting means for a storage container for fuel assembly clusters, said mounting means comprising a plurality of beams, each said beam including an upper strip of stainless steel, a lower strip of steel and at least one row of posts disposed in longitudinally spaced relation along said strips, each said post extending transversely through each strip in welded relation thereto, and having a threaded end above said upper strip.

2. A mounting means as set forth in claim 1 wherein each threaded end is integrally formed on a respective post.

3. A mounting means as set forth in claim 1 wherein each post has an upper end flush with an upper surface of said upper strip and a threaded bore in said end, and wherein a threaded bolt is threaded into said bore to define said threaded end.

4. A mounting means as set forth in claim 3 wherein each post has a lower end flush with a lower surface of said lower strip and a threaded bore in said lower end, and wherein a fastening rod is threaded in said bore in said lower end.

5. A mounting means as set forth in claim 4 wherein said fastening rod has an external thread on a lower end thereof.

6. A mounting means as set forth in claim 5 which further comprises a pair of nuts on each external thread of a respective fastening rod and a flat steel bracket, each said fastening rod extending through said bracket with said nuts on opposite sides of said bracket.

7. A mounting means as set forth in claim 4 wherein each said post and each said fastening rod is made of stainless steel.

8. A mounting means as set forth in claim 1 which further comprises a pair of sheets welded to and extending outwardly of opposite longitudinal edges of said upper strip for lining a water pit in which said mounting means is adapted to be disposed.

9. A mounting means as set forth in claim 8 which further comprises a channel welded to said upper strip below a respective longitudinal edge, said channel having a free upper edge extending into substantially flush relation with an adjacent sheet to define a drainage channel for water.

* * * * *